United States Patent [19]
Lin et al.

[11] Patent Number: 6,083,409
[45] Date of Patent: Jul. 4, 2000

[54] METHOD FOR TREATING ORGANIC WASTES

[75] Inventors: Shi-Ying Lin, Tokyo; Hiroyuki Hatano; Yoshizo Suzuki, both of Tsukuba, all of Japan

[73] Assignees: Center for Coal Utilization, Japan; Japan as represented by Director General of Agency of Industrial Science and Technology, both of Tokyo, Japan

[21] Appl. No.: 09/299,340

[22] Filed: Apr. 26, 1999

[30] Foreign Application Priority Data

Nov. 18, 1998 [JP] Japan .................................. 10-365994

[51] Int. Cl.[7] .................................................... C02F 1/72
[52] U.S. Cl. ........................... 210/758; 210/762; 210/763; 210/908
[58] Field of Search ................................. 210/758, 761, 210/762, 763, 908

[56] References Cited

U.S. PATENT DOCUMENTS

| | | | |
|---|---|---|---|
| 5,252,224 | 10/1993 | Modell et al. | 210/695 |
| 5,460,792 | 10/1995 | Rosenbaum | 423/245.3 |
| 5,492,634 | 2/1996 | Hong et al. | 210/761 |
| 5,630,854 | 5/1997 | Sealock, Jr. et al. | 48/127.7 |
| 5,746,926 | 5/1998 | Ross et al. | 210/761 |

FOREIGN PATENT DOCUMENTS

| | | |
|---|---|---|
| 9-276900 | 10/1997 | Japan . |
| 10-88146 | 4/1998 | Japan . |
| 10-137775 | 5/1998 | Japan . |

OTHER PUBLICATIONS

Hydrogen Production from High–Moisture–Content Biomass in Supercritical Water; by Michael Antal, Hodrogen InfoNet, Web Site: http://www.eren.doe.gov/hydrogen/hydprod.htm, May 13, 1998.
Hydrogen Production from Biomass Using Supercritical Water; by Yukihiko Matsumura, (6 pages).

*Primary Examiner*—David A. Simmons
*Assistant Examiner*—Betsey J. Morrison
*Attorney, Agent, or Firm*—Flynn, Thiel, Boutell & Tanis, P.C.

[57] ABSTRACT

Organic materials such as raw refuse, waste plastics, waste biomass, sludges, etc. are decomposed by the use of supercritical water to selectively produce hydrogen. A thermochemical reaction is promoted to reduce the supercritical water and selectively produce hydrogen, without substantially adding any oxidizing agent to the supercritical water of a specific temperature and pressure, in the presence of a carbon dioxide-absorbing substance in an amount sufficient to absorb all of the generated carbon dioxide, so that carbon contained in the organic wastes reduces the supercritical water, and hence the organic materials are completely decomposed and also hydrogen gas is removed.

11 Claims, 5 Drawing Sheets

METHOD FOR TREATING ORGANIC WASTES

BACKGROUND OF THE INVENTION

1. Field of the Invention

It has been conventionally known to decompose organic wastes with supercritical water. It is also known that decomposition of organic materials with supercritical water results in a clean decomposition product, thereby decomposing even PCB, dioxine, etc.

The present invention relates to the technology of organic wastes decomposition with supercritical water, and more particularly to a method for treating organic wastes in which carbon contained therein is reacted with supercritical water under a specific condition to convert all of such organic wastes to a gas product containing hydrogen as a main component and a carbonate. The thus-formed decomposition product is quite clean as a matter of course.

2. Description of the Related Art

FIG. 1 shows a conventional oxidation decomposing method of organic materials by the use of supercritical water.

After organic materials and water are mixed, the mixture is pumped to a supercritical water reactor 1 where water in the supercritical state is formed by means of a pump 2, kept in the supercritical water reactor 1 at a temperature of about 400° C. for a predetermined period of reaction time and then cooled by means of cooler 3 under a reduced pressure to form a gaseous oxidation decomposed product, water and solid residue. Air or oxygen as an oxidizing agent is supplied to the supercritical water reactor 1 to maintain the supercritical state while externally heating the reactor if the heat generated therein is not enough.

Under the above mentioned reaction conditions, the gaseous oxidation decomposed product predominantly comprises carbon dioxide and nitrogen gas originating from nitrogen components contained in the organic materials. It is well known that dioxins causing a problem in general incineration is not produced at this time.

According to a conventional process, thermal decomposition is conducted in supercritical water at a temperature of 400 to 600° C. only with external heating without supplying any oxidizing agent, which results in a gaseous thermal decomposition product containing carbon monoxide, carbon dioxide, lower hydrocarbons, hydrogen and nitrogen as a main component and, in many cases, a liquid product. As the temperature of thermal decomposition increases, the yield of the gaseous product increases but that of hydrogen decreases.

According to JP-A No. 2-274,269, flon or flon-containing material is decomposed by alkali-containing supercritical water to control environmental pollution. In this process, carbon contained in organic wastes does not react quickly when oxygen or air is used as an oxidizing agent at a reaction temperature of 400° C.

On the other hand, JP-A No. 9-314,155 discloses a process in which organic materials contained in sewage are combined with an oxidizing agent and introduced to a supercritical zone to decompose an organic component thereof by critical oxidation. When salts formed during the decomposition are dissolved in semi-critical water in a semi-critical zone and discharged as an effluent from a reaction system, the effluent is exhausted as it is if the content of the organic materials is within a predetermined standard level, while it is recycled to the reaction system if such an organic content is above the level.

According to this reference, however, reaction with supercritical water "without substantially adding an oxidizing agent" is not disclosed.

It has been conventionally conducted to decompose organic materials by oxidation in supercritical water while adding an oxidizing agent, or without adding any oxidizing agent for a purpose to obtain elements or molecules as constituents of the organic materials. However, it has not been thought or proposed to react carbon contained in organic materials with supercritical water followed by reductive decomposition of the supercritical water and simultaneous decomposition of the organic materials.

From the above mentioned viewpoint, the inventors have exclusively investigated various conditions to thermochemically decompose water and at the same time to decompose organic materials, and finally found that such decomposition can be achieved by a combination of supercritical water at a specific condition and a carbon dioxide absorbing substance without adding an oxidizing agent.

SUMMARY OF THE INVENTION

When organic materials are decomposed by supercritical water without adding any oxidizing agent, the thermal decomposition thereof at about 400° C. does not proceed completely and yields a gaseous product containing carbon monoxide, carbon dioxide, hydrogen, nitrogen, lower hydrocarbons and the like as main components and a liquid product. In this case, the hydrogen content in the gaseous product is considerably low.

When the reaction temperature is further increased up to 650° C., the liquid product disappears and the organic materials are completely gasified. The thus-formed gaseous product comprises carbon monoxide, carbon dioxide and hydrogen as main components, while the composition thereof is limited within a value of thermodynamical equilibrium which is determined by the reaction temperature and the reaction pressure, thereby the hydrogen content being about 30%.

According to the present invention, it has been found that the hydrogen content in the gaseous product formed by the reaction is successfully increased to a considerable degree while keeping the thermodynamical equilibrium by use of supercritical water of a specific condition and a gas absorbing substance.

Further, it has been found that sulfur and halogen are captured in a reactor without being entrained in the formed gaseous product and can be finally recovered as water-soluble salts from the reactor.

The substantial absence of an oxidizing agent during the reaction of the present invention means that the addition of the oxidizing agent is not necessary, of course, but also means that the removal of air, etc. contained in reagents or starting materials is not necessary during the charging thereof into a reaction unit. This improves the compressing energy consumption because the supply of high pressure air can be omitted, and advantageously reduces the operating cost of the unit as a whole.

Organic wastes used by the present invention include various kinds of organic garbage in a general sense such as domestic raw refuse, packing paper, newspaper, magazines, plastics, gardening wastes of grasses and trees, etc., as well as industrial wastes such as waste paper, waste wood, waste oil, waste plastics, waste water containing organic materials, or sludge from sewage treatment plants.

The hydrogen content in the gaseous product is not so increased when the organic materials are thermally decomposed in supercritical water, even at a temperature of 650° C., because carbon monoxide, steam, carbon dioxide and hydrogen contained in the gaseous product formed by the reaction of the organic materials and supercritical water are kept in a state of chemical equilibrium. The equilibrium reaction is represented as in the following:

$$CO + H_2O = CO_2 + H_2 \tag{1}$$

When an excessive amount of substance which reacts with carbon dioxide to form a solid product under a condition of the temperature and pressure used in the reactor and never affects the above mentioned chemical equilibrium coexists in advance in the reaction system as a carbon dioxide-absorbing substance, the amount of carbon dioxide contained in the gaseous product is reduced by the reaction thereof with the substance.

As the amount of carbon dioxide decreases, CO and $H_2O$ is inevitably reacted to form $CO_2$ and $H_2$ in order to sustain the chemical equilibrium. The thus-formed $CO_2$ is reacted with the carbon dioxide-absorbing substance and removed from the gaseous product.

As a result, the gaseous product finally attains a chemical equilibrium in which a negligible amount of carbon monoxide and carbon dioxide and a considerable amount of steam and hydrogen exist. It is possible to separate the gaseous product and a solid mixture consisting of an ash of the organic materials, the unreacted carbon dioxide absorbing substance and a solid reaction product thereof, and the steam being cooled and collected as water. Thus, the gaseous product containing hydrogen as a main component can be produced from the organic materials.

A chemical reaction formula of carbon dioxide absorption is represented in the following:

$$C + 2H_2O + X = (XCO_2) + 2H_2 \tag{2}$$

wherein X is a carbon dioxide-absorbing substance.

As the thus-formed hydrogen gas is originated from water, the reaction formula (2) shows that hydrogen is selectively produced from carbon contained in the organic materials and water, which is regarded as a thermochemical decomposing reaction of water.

The heat source for conducting the reaction includes the heat of combustion caused by the oxidation of carbon contained in the organic materials and a carbon dioxide absorbing substance to be added to the reaction system. For example, CaO, as the absorbing substance, radiates a heat of reaction thereof with water to form $Ca(OH)_2$, which can be used as the heat source as a matter of course. External heating, such as using a combustible gas, may be employed to promote the reaction (2), if the heat is insufficient.

The gas generated from the organic materials according to the present invention is hydrogen as a main component and methane, nitrogen gas or carbon oxide or the like is mixed therewith. Although the generated gases may be separated and used for their own purposes, a part of the combustible gas contained in the generated gas is used as heating energy for maintaining the temperature of the reaction system.

In order to conduct the following reaction of the carbon dioxide-absorbing agent X, $$X + CO_2 = XCO_2 \tag{3}$$

the reaction system should be heated above a thermodynamically determined temperature.

Accordingly, the reaction system of the present invention is inevitably subjected to a temperature higher than what is achieved by the reaction formula (3).

A typical carbon dioxide-absorbing substance includes an oxide of metals, such as CaO, MgO, iron oxide (FeO, $Fe_2O_3$, $Fe_3O_4$), etc., and a hydroxide of similar metals, such as $Ca(OH)_2$, $Mg(OH)_2$, $Fe(OH)_2$, $Fe(OH)_3$, etc. Most preferably, CaO or $Ca(OH)_2$ is used from a standpoint of economy. In addition, MgO, $Mg(OH)_2$, FeO, $Fe_2O_3$ or $Fe_3O_4$ is also effective as the absorbing substance.

As each of these hydroxides results in a dehydration reaction under a high temperature condition as in the following, $$Ca(OH)_2 = CaO + H_2O \tag{4}$$

$$Mg(OH)_2 = MgO + H_2O \tag{5}$$

the reaction is conducted in a similar manner as in the case where an oxide of similar metals is initially added.

A sulfur component in the organic materials reacts with the absorbing substance X in the process of the reaction to form a sulfate thereof as a solid product, which is hardly soluble in water and accordingly not preferable. In order to prevent such an inconvenience, another substance Y, which easily reacts with the $H_2S$ formed in the process of gasification, is added to form a water-soluble reaction product of Y and $H_2S$.

As the sulfur component in the organic materials becomes water-soluble as described above, it is possible to separate sulfur from other solid products, such as the reacted and unreacted carbon dioxide-absorbing substance, the ash content in organic materials, etc. A halogen component in the organic materials also forms water-soluble salt.

The above-mentioned substance Y includes NaOH, $Na_2CO_3$, KOH and $K_2CO_3$. It is convenient that the substance Y generally plays the role of a catalyst to promote the reaction between the organic materials and water in a supercritical condition. Only $Na_2CO_3$ is used as the substance Y in the examples which will be described in the following, although NaOH, KOH or $K_2CO_3$ functions similarly.

It is necessary to thermodynamically determine the progress of the reaction. The heat of reaction of the main reaction is as in the following:

$$C + H_2O = CO + H_2 \quad 31.4 \text{ kcal. (endothermic reaction)} \tag{6}$$

$$H_2O + CO = CO_2 + H_2 \quad -9.9 \text{ kcal. (exothermic reaction)} \tag{7}$$

$$CaO + CO_2 = CaCO_3 \quad -42.5 \text{ kcal. (exothermic reaction)} \tag{8}$$

Accordingly, as the reaction as a whole is represented as in the following:

$$C + 2H_2O + CaO = CaCO_3 + 2H_2 \quad -21.0 \text{ kcal. (exothermic reaction)} \tag{9}$$

it is considered that the reaction is at least exothermic, and proceeds spontaneously from a thermodynamic standpoint.

PREFERRED EMBODIMENT OF THE INVENTION

Mode of the present invention is as follows:

A first aspect of the present invention provides a method for treating organic wastes by reacting carbon contained therein with supercritical water in which the reaction is conducted in the presence of a carbon dioxide-absorbing substance at least in an amount sufficient to absorb all of the generated carbon dioxide, under a pressure of 220 atmosphere or higher and a temperature of 600° C. or higher without substantially adding an oxidizing agent.

A second aspect of the present invention provides a method for treating organic wastes in which organic wastes and a carbon dioxide absorbing substance are supplied to a reaction system, while generated gas and a carbonate are taken out of the reaction system.

A third aspect of the present invention provides a method for treating organic wastes in which a part of the combustible gas contained in the generated gas is used as heating energy for a reaction system.

A fourth aspect of the present invention provides a method for treating organic wastes in which a carbonate is converted by thermal decomposition to a carbon dioxide-absorbing substance so as to allow the recycle thereof to a reaction system.

A fifth aspect of the present invention provides a method for treating organic wastes in which CaO, MgO or iron oxide is used as a carbon dioxide-absorbing substance.

A sixth aspect of the present invention provides a method for treating organic wastes in which the organic wastes contain an inorganic material such as scrap iron, sand, glass, etc.

A seventh aspect of the present invention provides a method for treating organic wastes in which the organic wastes are reduced in size and supplied to a reaction system in a water-containing condition.

An eighth aspect of the present invention provides a method for treating organic wastes in which the sludge is used as an organic sludge and supplied to a reaction system without drying in a water-containing condition.

A ninth aspect of the present invention provides the method for treating organic wastes in which the reaction temperature is in the range of 650° C. or higher to 850° C. or lower.

A tenth aspect of the present invention provides a method for treating organic wastes in which, in addition to a carbon dioxide-absorbing substance, a substance capable of forming a water-soluble salt with sulfur and a halogen is present at least in an amount sufficient to absorb all of the generated sulfur and halogen.

An eleventh aspect of the present invention provides a method for treating organic wastes in which a substance capable of forming a water-soluble salt with sulfur and halogen atoms is one or more compounds selected from a group consisting of NaOH, $Na_2CO_3$, and KOH and $K_2CO_3$.

Figure 1:
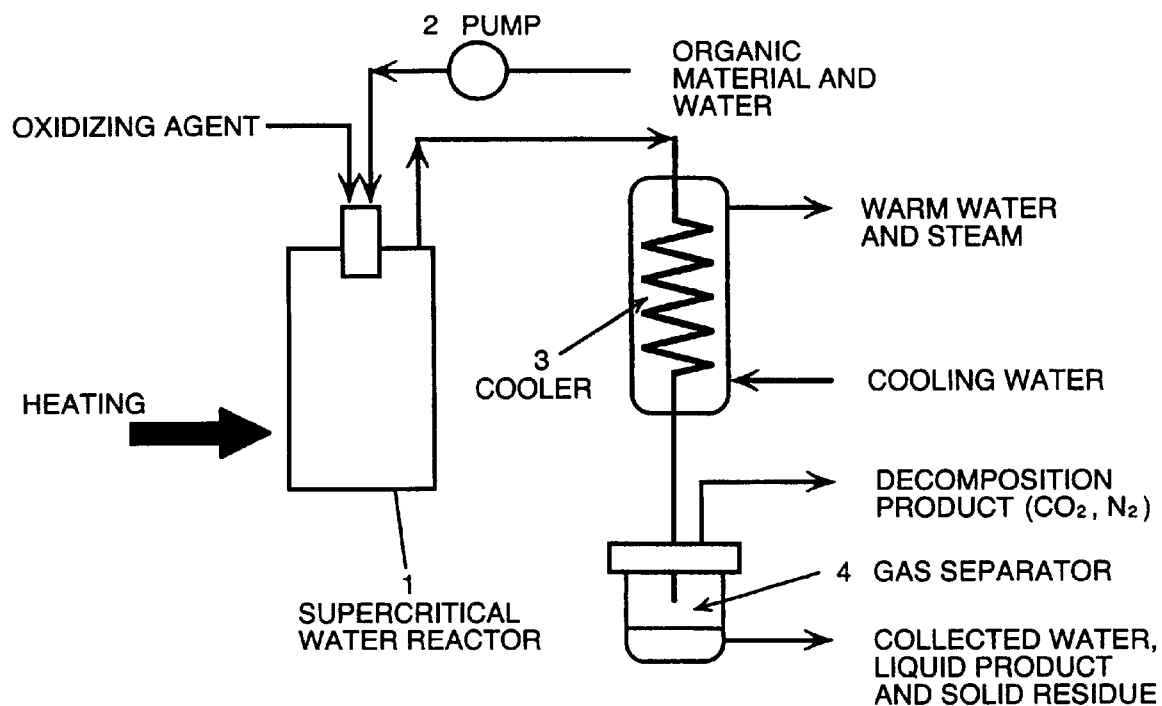
FIG. 1 is an illustration of a conventional technique for thermally decomposing organic materials by oxidation using supercritical water.
Figure 2:
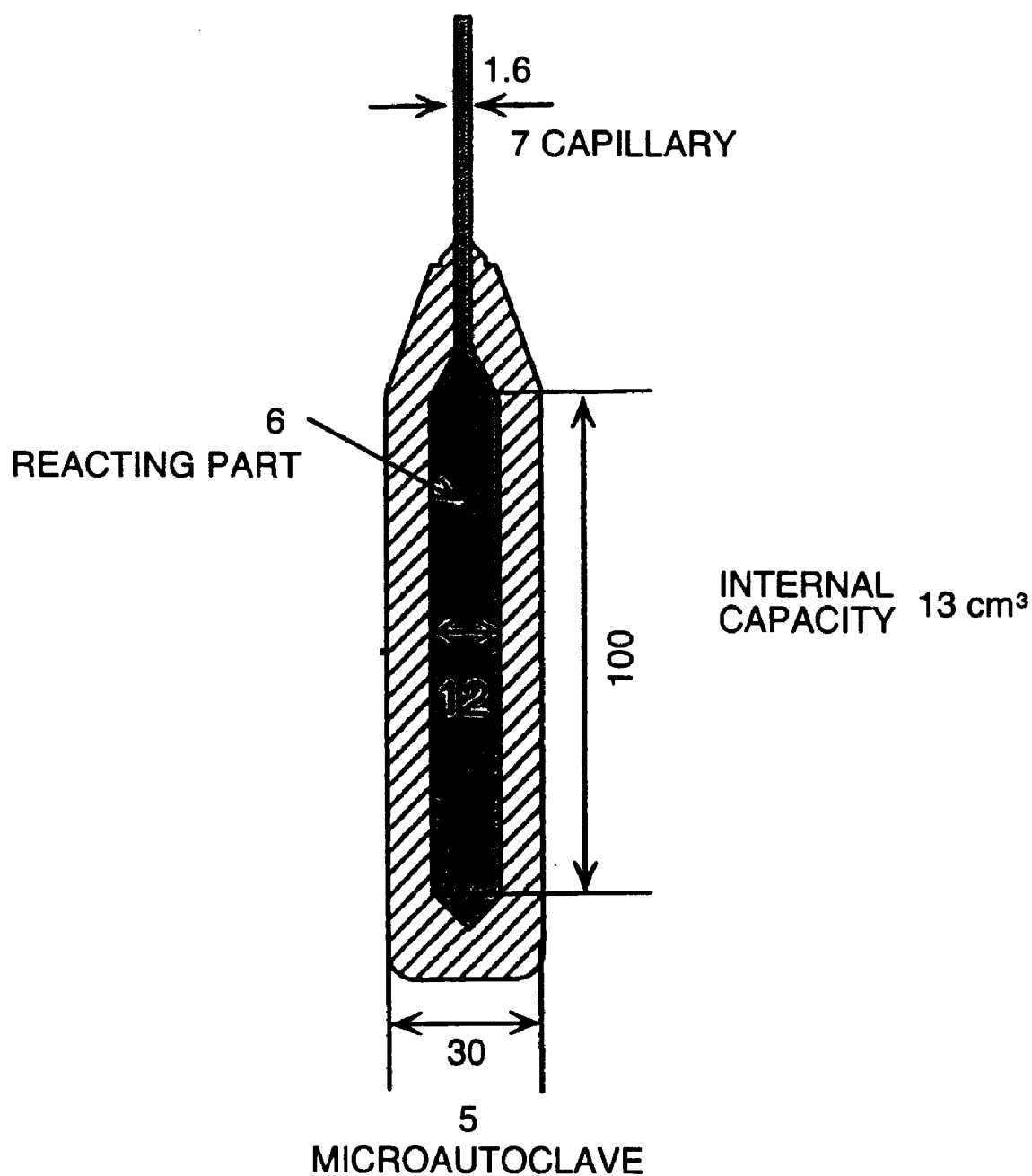
FIG. 2 is a cross-sectional view of a system used in the present invention.

There was used a microautoclave 5 having an outer diameter of 30 mm provided with a capillary 7 as shown in FIG. 2 to carry out the present invention. The pressure in the microautoclave 5 was changed by controlling the quantity of pure water to be initially charged and the heating temperature. The pressure of the reaction was obtained by the following equation of state:

$$P = RT/(V_m - b) - a/V_m^2$$

wherein p represents pressure, R represents the gas constant, T represents absolute temperature, $V_m$ represents quantity of water and a and b are constants.

Using coal as a tentative organic waste, the following experiments were carried out to confirm the effect of pressure on the reaction and the function of carbon dioxide-absorbing agents used in the present invention and substances capable of forming a water-soluble salt with sulfur and halogen during the reaction of carbon contained in the organic materials.

EXAMPLE 1

After 0.1 g of pulverized Taiheiyo Coal (carbon content of 76%), an excessive equivalent weight, 0.6 g, of $Ca(OH)2$ powder and a specified quantity, 4 cc, of pure water were mixed, the mixture was injected in a reaction vessel 6 having an inner diameter of 12 mm by means of a syringe through a capillary 7 having a bore diameter of 1.6 mm, externally heated in an electric furnace and reacted for 20 minutes at a temperature of 650° C. under a pressure of 1,000 atmospheres. Then, the reaction mixture was cooled, and the generated gas was collected in a sampling bag to measure the quantity of the thus-generated gas, while the composition thereof was determined by gas chromatography. Solid and liquid products left in the reaction vessel were collected and analyzed.

EXAMPLE 2

A similar process was repeated under the same conditions except that 0.1 g of sodium carbonate was added to the reaction system.

EXAMPLE 3

The process of Example 1 was similarly repeated except that 0.03 g of Taiheiyo Coal, 0.2 g of $Ca(OH)_2$, 0.03 g of $Na_2CO_3$ and 1 cc of pure water to be initially charged were used under a pressure of 300 atmospheres.

EXAMPLE 4

The process of Example 1 was similarly repeated except that 0.025 g of Taiheiyo Coal, 0.15 g of $Ca(OH)_2$, 0.025 g of $Na_2CO_3$ and 0.55 cc of pure water to be initially charged were used under a pressure of 250 atmospheres.

For reference, using a comparative sample prepared only from pulverized coal and water, the process of Example was repeated.

Figure 3:
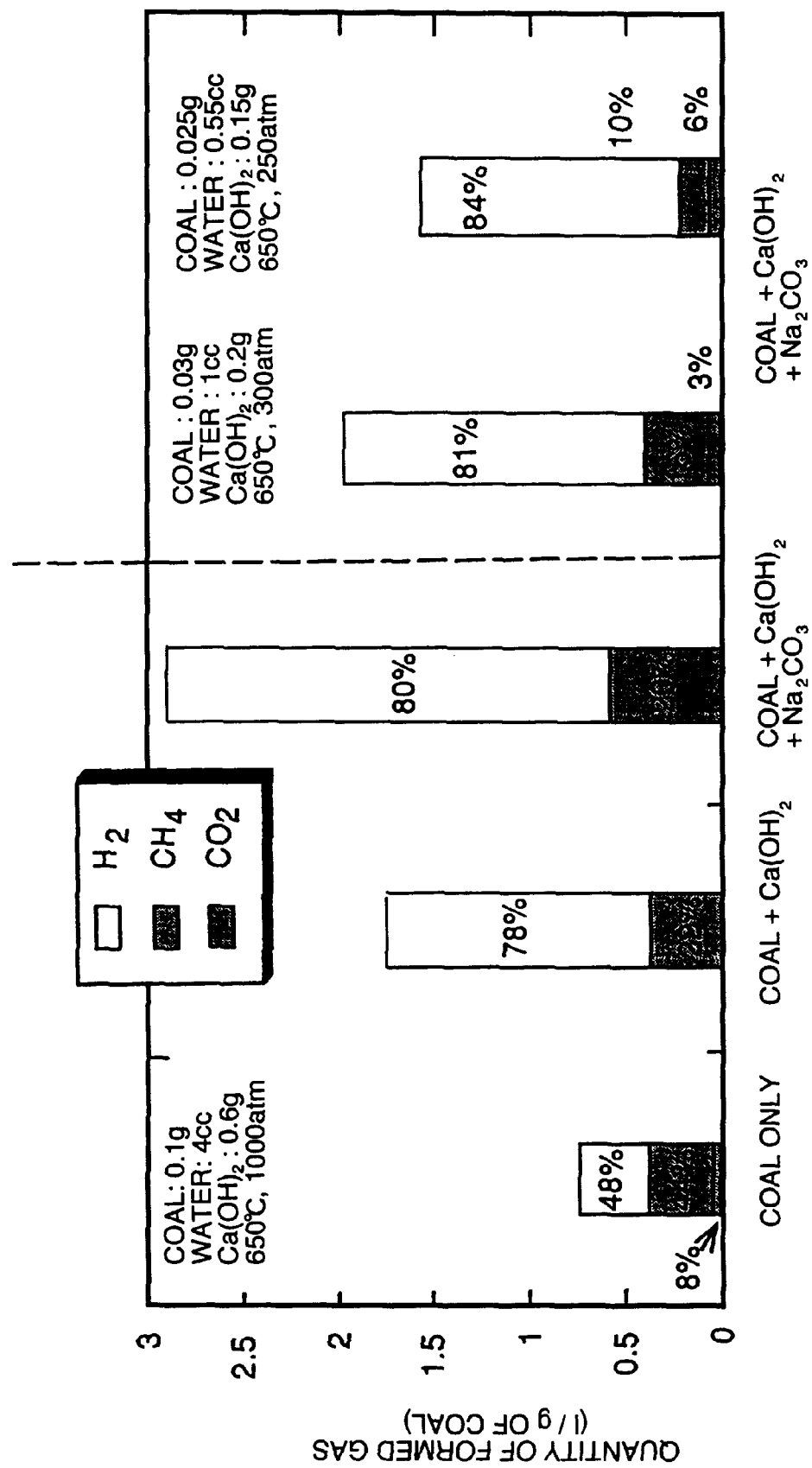
FIG. 3 is an illustration of experimental results demonstrating a principle of the present invention and the effect of a catalyst.

The result obtained is shown in FIG. 3.

When coal and water are thermally decomposed in supercritical water at a temperature of 650° C. and a pressure of 1,000 atmosphere, the quantity of gas thus yielded is only 0.7 l/g and contains a lower hydrogen content of 48%. The unreacted organic materials are present in the residue.

When $Ca(OH)_2$ is added as the carbon dioxide-absorbing substance to the reaction system, the quantity of formed gas is 2.5 times and the hydrogen content therein improves to 78%. Moreover, the addition of $Na_2CO_3$ allows a further increase in the quantity of gas. FIG. 3 shows that $Na_2CO_3$ functions as a catalyst to improve the reaction rate of reaction formula (2). As a matter of course, sulfur can be captured by the addition of $Na_2CO_3$ as a water-soluble salt.

When the pressure of the reaction is lowered, the quantity of formed gas decreases, which suggests that such a decrease in gas formation is simply due to the reduction of the decomposition rate. FIG. 3 shows a practical result of the present invention and, at the some time, clearly demonstrates the effect of additives.

According to the formula (9), 2 mole of hydrogen is produced from 1 moles of carbon, and 2.83 $Nm^3$ /kg of hydrogen can be produced theoretically from coal containing 76% of carbon. It is found from the result of experiments that a certain amount of $CH_4$ is formed as a by-product other than hydrogen. This would be caused by the reaction of $CO_2$ and $H_2$.

When $Na_2CO_3$ is not added to the reaction system, sulfur components in the coal are solidified as $CaSO_4$, which is insoluble in water and hardly separates from other solid substances. The addition of $Na_2CO_3$ allows sulfur in the coal to be finally captured as water-soluble $Na_2SO_4$ and advantageously removed out of the system by water treatment.

No sulfur component originating from coal was found in gas products formed in Examples 1 to 4 which suggests that sulfur was fixed. In these cases, it is considered that sulfur is fixed as water-soluble $Na_2SO_3$ due to the addition of $Na_2CO_3$.

EXAMPLE 5

Sewage sludge collected from a sewage treatment plant was dried and milled for use as a starting organic material. In a reaction vessel 6, 0.5 g of powdery sewage sludge, 0.6 g of $Ca(OH)_2$ powder in an excessive equivalent amount and 4.0 cc of water in an equivalent amount were mixed. The thus-prepared mixture was injected by an injector into the reaction vessel back surface 6 having an inner diameter of 12 mm through a capillary having a bore of 1.6 mm, and subjected to a reaction under a pressure of 1,000 atmosphere at a temperature of 650° C. for 20 minutes in an electric furnace while externally heating. The mixture was cooled after the reaction was completed, and the formed gas recovered, while the composition thereof was determined by means of gas chromatography.

Further, solid and liquid products left in the reaction vessel were collected and analyzed.

Figure 4:
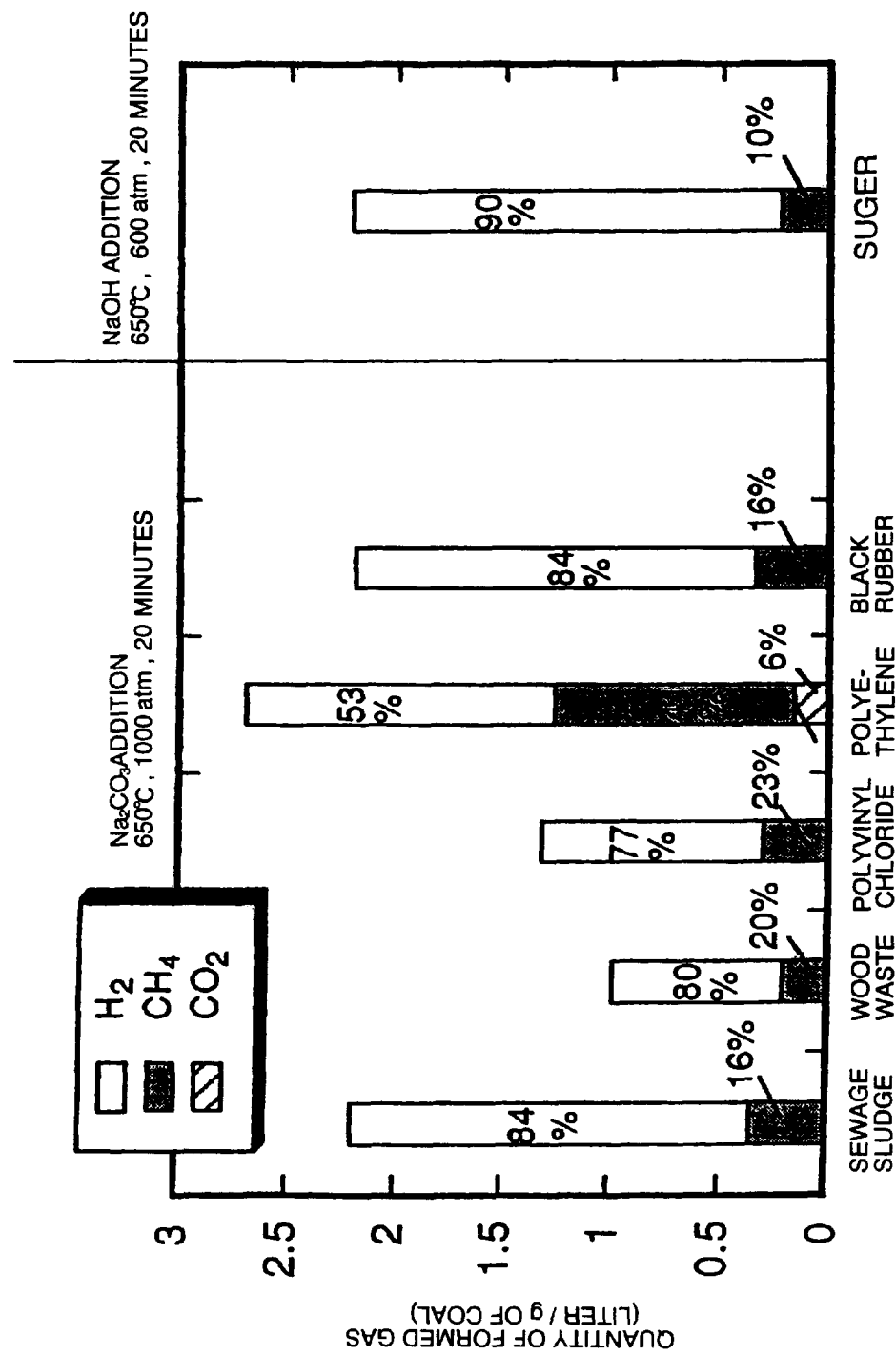
FIG. 4 is an illustration of experimental results showing the quantity and composition of gas generated by reacting various kinds of organic materials and supercritical water under the conditions of the present invention.

The results are shown in FIG. 4. It is found from FIG. 4 that 2.2 liters of gas are formed from 1 g of the sewage sludge and the gas comprises 84% of hydrogen. The rest of the gas is methane, while the concentration of $CO_2$ and CO is almost undetectable. The carbon content in the dried sewage is reacted according to the formula (9).

EXAMPLES 6 to 9

Four kinds of organic materials, i.e., wood waste, polyvinyl chloride, polyethylene and black rubber, respectively in amounts of 0.1 g, were used in series as a starting material. With each of these materials, 0.6 g of $Ca(OH)_2$ as a carbon dioxide-absorbing substance, 4 cc of water and 0.1 g of $Na_2CO_3$ as a reaction catalyst and a sulfur-capturing agent were added and externally heated in an electric furnace to conduct the reaction for 20 minutes at a temperature of 650° C. and a pressure of 1,000 atmospheres. Then, the reaction mixture was cooled, and the generated gas was collected in a sampling bag to measure the quantity of the thus-generated gas, while the composition thereof was measured by gas chromatography. Solid and liquid products left in the reaction vessel were collected and analyzed.

EXAMPLE 10

With 0.1 g of commercially available granulated sugar as a starting organic material, 0.45 g of $Ca(OH)_2$ as a carbon dioxide-absorbing substance, 2 cc of water and 0.1 g of NaOH as a catalyst and also as a sulfur-capturing agent were mixed. A similar procedure as described in Examples 6 to 9 was repeated.

FIG. 4 shows the quantity and composition of a gas product formed by treating the organic material. The result apparently shows that all of the organic materials contained in wastes can be used in the present invention. When a mixture of organic wastes is used, a similar result is obtained as a matter of course.

Further, it has been confirmed that a protein yields a similar result, although no example thereof is described hereinbefore.

(Application of these Examples to a practical process)

Figure 5:
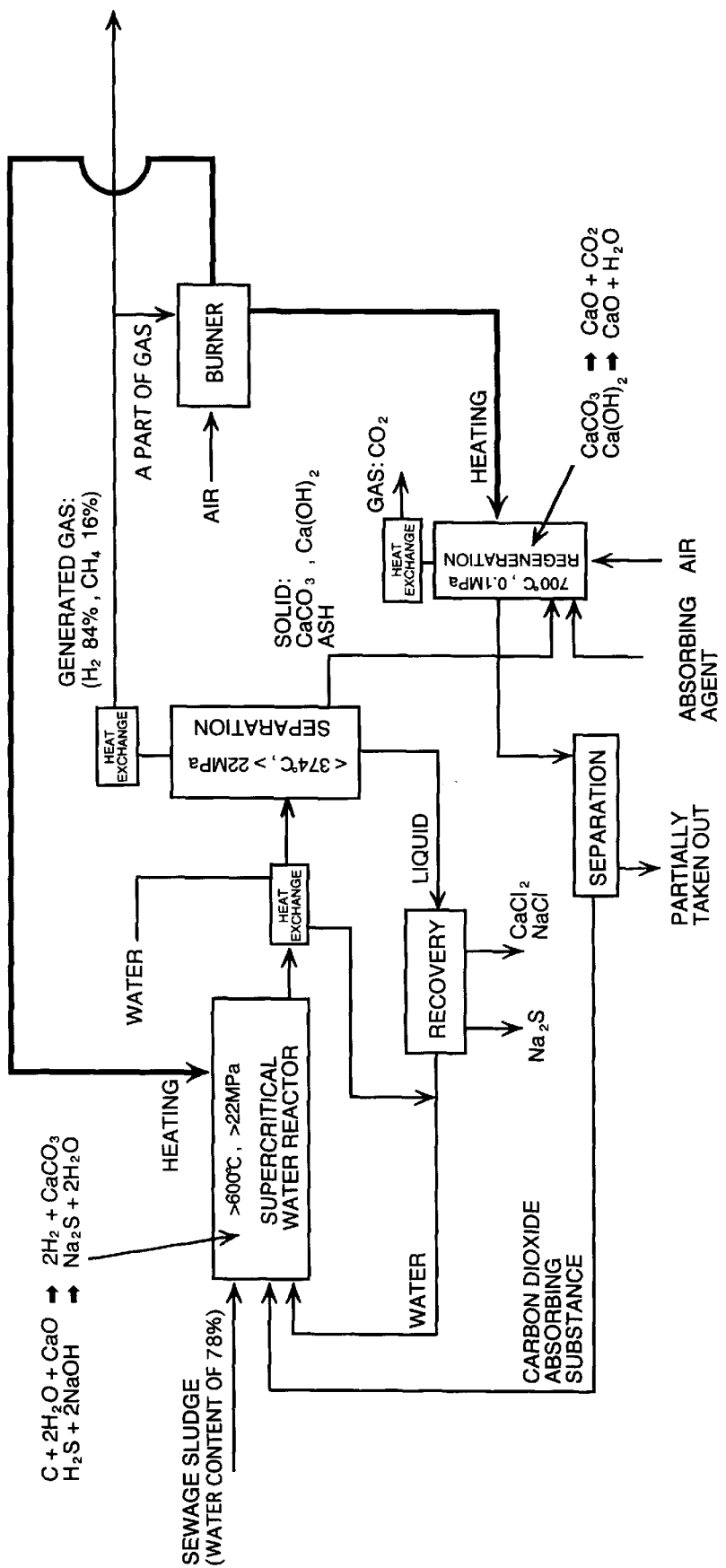
FIG. 5 is a flowchart of a hydrogen production process starting from an organic material according to the present invention.

A process may be designed as shown in FIG. 5 on the basis of results.

Although several processes can be constructed, basic concepts of the process are as in the following:

(1) Requirements of the starting material is based on an internal heating system and, if necessary, supplied by a combustible gas contained in the formed gas product.

(2) Heating of the starting material is based on an internal heating system and, if necessary, supplied by a combustible gas contained in the formed gas product. That is, the heat of reaction of CaO and supplemental heat of the combustible gas are used to heat the organic wastes.

A process starting from sewage sludge will be described hereinafter. In general, sewage sludge is dehydrated to a water content of about 78% by means of centrifugal separator. Using the thus dehydrated sludge as it is, the present process is carried out. Nearly 100% of the sewage sludge is reacted in a reactor due to the higher reactivity thereof as shown in Example 5. A part of the combustible gas is combusted to regenerate the $CaCO_3$ and heat the reactor using the heat of combustion. It is possible to recover $CO_2$ in high concentrations from a $CaCO_3$ regenerator, which is meaningful from a viewpoint of exhaust control of the warming gas. When the sewage sludge is treated by the present process, excessive and useful gas can be recovered. About half of the combustible gas formed thereby is consumed by the process, although the consumption thereof depends on the heat quantity and carbon content of each sewage sludge to be used. In a conventional sewage sludge burning treatment, as a considerable heat quantity of combustion thereof is used for drying, a heat supply from outside is required in addition to the combustible gas. According to the present process, however, such an additional heating source is not necessary and, moreover, excessive energy which comprises valuable hydrogen is recovered usefully.

The characteristic feature of the present invention is that the present process can be widely applied to organic wastes. A high flexibility of the present invention is worth noting.

Although the specific process is somewhat modified depending on the starting material, each process can be conveniently constructed to decompose organic wastes, while producing hydrogen at a high efficiency and preventing exhaustion of harmful elements to the environment. Such a production of hydrogen is meaningful in order to recover both energy and the material. Further, $CO_2$ as a byproduct of the process can be recovered in high concentration, which is quite advantageous from the standpoint of effective treatment and utilization of $CO_2$ as a global warming gas, and is less stimulative to the environment.

It is possible to provide a technology of hydrogen production by simply combining organic wastes and cheap and general substances or materials such as water, air, limestone and sodium carbonate.

specific effects of the present invention are as follows:

(1) Domestic or urban refuse can be treated safely;

(2) Organic wastes can be treated without drying. This is quite advantageous for the treatment of both sewage and organic sludges;

(3) The process can be conducted without separating all of the plastic wastes;

(4) Polluting substances such as sulfur, chlorine, etc. contained in organic wastes can be captured;

(5) Useful gases such as hydrogen, methane, etc. can be recovered as a reaction product as a result of the decomposition treatment of organic wastes;

(6) Dioxines and hydrogen chloride are not formed, which cause environmental problems;

(7) A system for conducting the present process allows the reduction of the operation costs because cheap substances such as limestone (CaO), sodium sulfate, etc. are used, and in addition, air or other oxidizing agents are not necessarily injected into a reaction system; and (8) Problems caused by a complicated collection of domestic refuse due to separation into combustible and incombustible refuses can be solved by the present process.

What is claimed is:

1. A method for treating organic wastes by reacting carbon contained therein with supercritical water in which a reaction is conducted in the presence of a carbon dioxide-absorbing substance in an amount sufficient to absorb all generated carbon dioxide under a pressure of 220 atmospheres or higher and a temperature of 600° C. or higher without substantially adding an oxidizing agent.

2. A method for treating organic wastes claimed in claim 1 in which organic wastes and a carbon dioxide-absorbing substance are supplied to a reaction system and a generated gas and a carbonate are taken out of the reaction system.

3. A method for treating organic wastes claimed in claim 1 in which a part of a combustible gas contained in a generated gas is used as heating energy for a reaction system.

4. A method for treating organic wastes claimed in claim 1 in which a carbonate is converted by thermal decomposition to a carbon dioxide-absorbing substance and recycled to a reaction system.

5. A method for treating organic wastes claimed in claim 1 in which CaO, MgO or iron oxide is used as a carbon dioxide-absorbing substance.

6. A method for treating organic wastes claimed in claim 1 in which the organic wastes contain an inorganic material.

7. A method for treating organic wastes claimed in claim 1 in which the organic wastes are reduced in size and supplied to a reaction system while containing water.

8. A method for treating organic wastes claimed in claim 1 in which the organic sludge is supplied to a reaction system without being dried and contains water.

9. A method for treating organic wastes claimed in claim 1 in which the temperature is in the range of 650° C. or higher to 850° C. or lower.

10. A method for treating organic wastes claimed in claim 1 in which, in addition to a carbon dioxide-absorbing substance, a substance capable of forming a water-soluble salt with sulfur and a halogen is present in an amount sufficient to absorb all generated sulfur and halogen.

11. A method for treating organic wastes claimed in claim 10 in which the substance capable of forming a water-soluble salt with sulfur and a halogen is at least one compound selected from the group consisting of NaOH, $Na_2CO_3$, KOH and $K_2CO_3$.

* * * * *